March 18, 1969  C. O. CHRISTENSEN  3,433,500
UNIVERSAL CASTER
Filed Aug. 28, 1967  Sheet 2 of 2
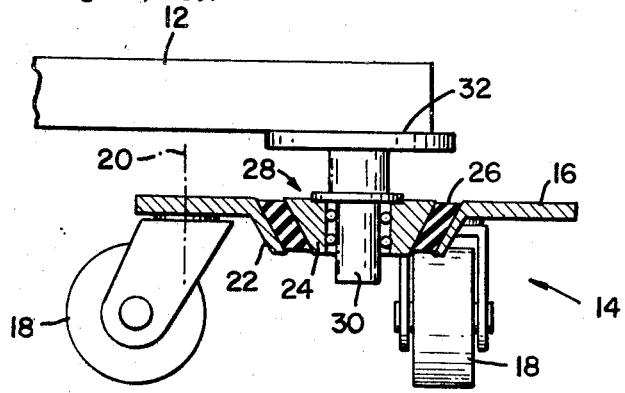
FIG_2
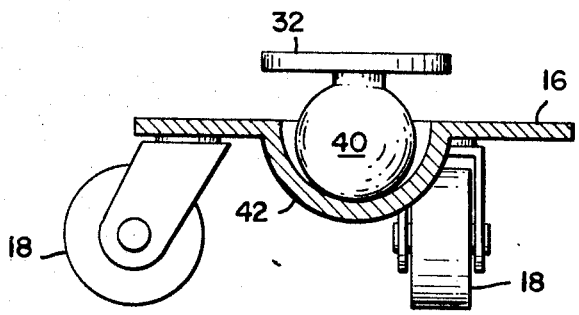
FIG_5
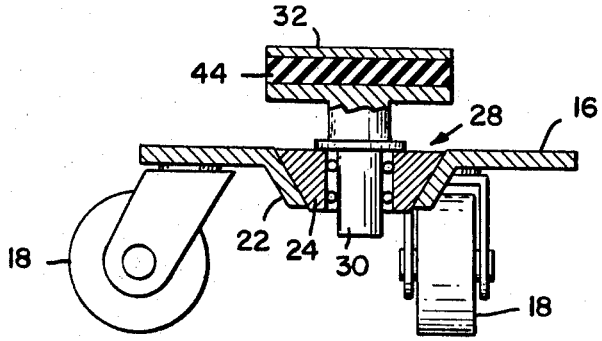
FIG_6
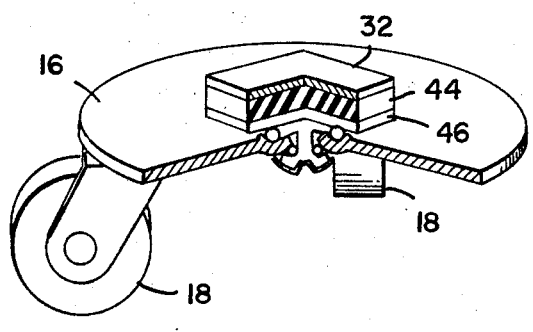
FIG_7
INVENTOR.
CARL O. CHRISTENSEN
BY
Mellin, Moore + Weissenberger
ATTORNEYS

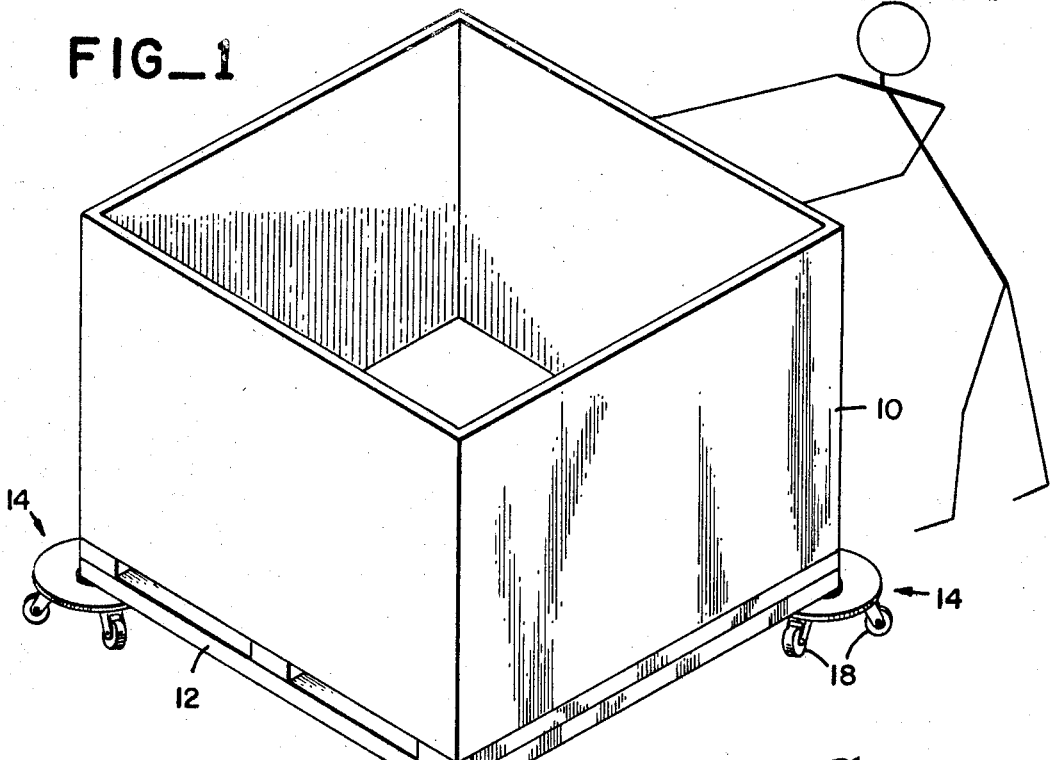
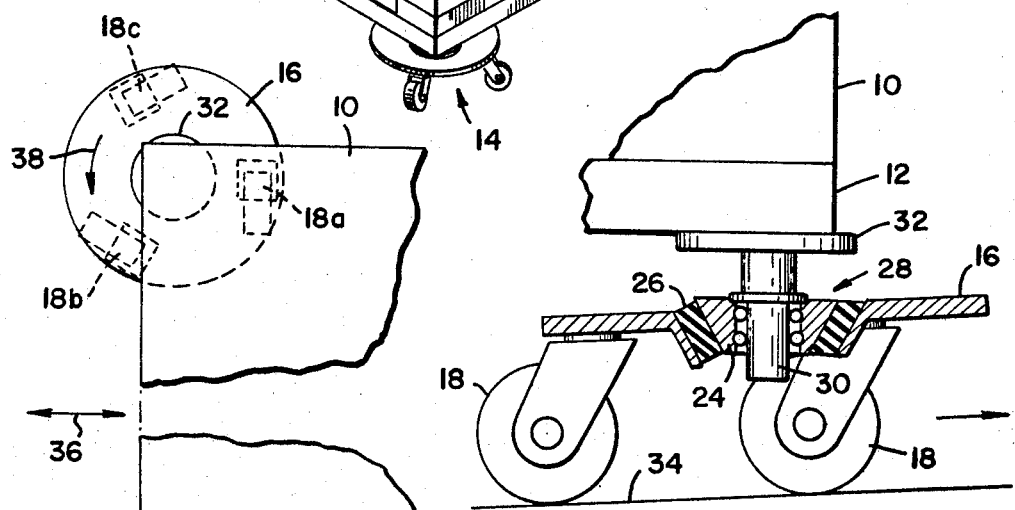
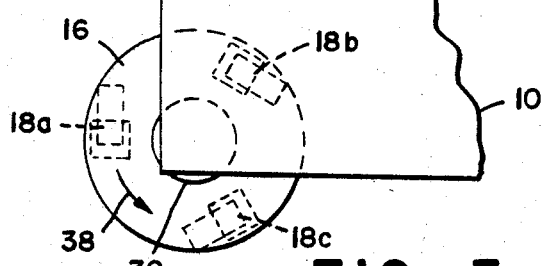

United States Patent Office 3,433,500
Patented Mar. 18, 1969

3,433,500
UNIVERSAL CASTER
Carl O. Christensen, Alamo, Calif., assignor to Roll-Rite Corporation, Oakland, Calif., a corporation of California
Filed Aug. 28, 1967, Ser. No. 663,895
U.S. Cl. 280—79.2                                    8 Claims
Int. Cl. B60b 33/00

ABSTRACT OF THE DISCLOSURE

A three-wheel universal caster in which the three wheels are mounted on a base for individual swiveling movement, and the base is arranged so that it can itself swivel with respect to the load support and also tilt to a limited degree with respect to the load support.

Brief summary of the invention

It is often desirable to use casters to move extremely heavy objects around a plant or over such uneven ground as a dock or paved area. This has been impractical up to now for several reasons. To begin with, the ordinary single-wheel caster has no stability of its own. Consequently, it must be mounted together with other casters on a frame adapted to receive the load. Where the objects to be moved are of different sizes, several frames of various sizes may have to be provided. Second, the cost of single-wheel casters and of the frame structure which has to support them increases exponentially with the load-carrying capacity of the caster due to the considerable flexing moments encountered in the operation of the casters. Third, single-wheel casters, when used with extremely heavy loads, may exert sufficient pressure on a factory floor or paved area to damage it. Fourth, when a frame with four casters is wheeled over uneven ground, one of the casters is periodically lifted out of engagement with the floor, so that the other three casters support the entire load and are consequently even more likely to damage the floor or pavement. Fifth, when the direction of movement of a heavily loaded frame equipped with single-wheel casters is reversed, the casters exert a tremendous resistance to forward movement of the load when they reach, during their reversal, a position at 90 degrees to the desired direction of movement. At that time, a certain amount of lateral movement of the load is practically inevitable.

The device of this invention overcomes all these disadvantages by providing compound universal casters which, though they may be attached to a frame, can equally be placed directly under the corners of the load without attachment and can be individually rolled under the corners of a load so as to accommodate any desired size of load.

In addition, the compound universal caster of this invention distributes the load of, say, a rectangular box, over twelve wheels instead of four. As a result, the construction of the caster can be much less sturdy, and the likelihood of damaging the floor or pavement is greatly reduced. Likewise, no heavy frame is necessary.

The great advantage of the caster of this invention, however, is that since the wheel-supporting caster base can freely swivel with respect to the load, the direction of movement of the load can be reversed without causing lateral movement of the load and without imposing undue resistance to forward movement of the load at any time.

Finally, the ability of the caster base to tilt with respect makes it possible for the caster to follow slight unevenness in the floor or pavement without causing any substantial change in the load distribution between the casters or even between individual wheels.

It is therefore the object of this invention to provide a three-wheel compound caster which can support a load without physical attachment to the load.

It is another object of the invention to provide a three-wheel compound universal caster whose wheels can freely swivel with respect to a base which itself can both swivel and tilt with respect to the load, so that the three wheels of the caster can evenly support the load even though the bottom of the load is not parallel to the floor on which the wheels roll.

It is still another object of the invention to provide a compound caster whose swiveling ability with respect to the load permits reversal of the direction of movement of the load without introducing any substantial lateral movement of the load or resistance to forward movement during reversal of the wheel position.

Brief description of the drawings

FIG. 1 is a perspective view of a load disposed on the casters of this invention;

FIG. 2 is a vertical section of a first embodiment of the caster of this invention;

FIG. 3 is a plan view of a pair of casters according to FIG. 2, illustratng their movement upon reversal of the direction of the movement of the load;

FIG. 4 is a section similar to FIG. 2, but showing the operation of the caster as it moves over a surface inclined with respect to the plane of the load;

FIG. 5 is a section similar to FIG. 2, but showing a second embodiment of the invention;

FIG. 6 is a section similar to FIG. 2, but showing a third embodiment of the invention; and FIG. 7 is a partially cut-away perspective view showing a fourth embodiment of the invention.

Description of the preferred embodiments

Referring now to the drawings, FIG. 1 shows a typical setup in which the invention is used. The load 10 may consist of any desired object. In FIG. 1, it is shown as a box of the type which has longitudinal openings 12 at the bottom for insertion of the forks of a fork lift. Such a box may be picked up by the fork lift (not shown) and may be freely set down onto four universal casters 14 which have first been rolled into position by hand under the four corners of the load 10. Three of the casters 14 are visible in FIG. 1.

The construction of each of the casters 14 is shown in more detail in FIG. 2. The universal caster 14 has a base 16 and three caster wheels 18, two of which are shown in the section of FIG. 2. It will be apparent from FIG. 3 that the caster wheels 18 are disposed equidistantly from one another around the perimeter of the base 16. Each of the caster wheels 18 is mounted to the base 16 for swiveling movement about a vertical axis such as 20 by any well-known means.

In the embodiment of FIGS. 1 through 4, the center of the base 16 forms a well 22 in the shape of an inverted frustum of cone whose sides may be inclined, in a preferred embodiment, at 30 degrees, or at such other angle as a specific construction may demand. A frusto-conical socket 24 is disposed in the center of the well 22 and is connected to the well 22 by a ring 26 of resilient material which is preferably rubber and which may be vulcanized to both the well 22 and the socket 24

At its center, the socket 24 has a ball bearing 28 of the thrust-and-radial type which supports the shaft 30 rigidly attached to the load-carrying element 32 for free rotational movement with respect to the socket 24.

Referring now to FIG. 4, it will be apparent that the caster 14 can follow an uneven floor 34 because the resiliency of the rubber ring 26 permits the base 16 to tilt to a limited degree without disturbing the position of the socket 24, shaft 30 or load-carrying member 32. Consequently, even through the floor 34 may be at a slight angle to the load 10, the load remains evenly distributed among the three wheels 18.

Referring now to FIG. 3, it will be seen that if, during a reversal of movement of the load 10 from one direction of the double-ended arrow 36 to the other, the wheels 18a swivel to a position normal to the direction of motion 36, no sideways motion will be imposed on the load because the base 16 will swivel in the direction of the arrows 38 until each of the wheels 18a, 18b and 18c has swiveled itself into a trailing position parallel to the direction in which the load 10 is being moved. The load-carrying member 32, of course, remains stationary with respect to the load 10 during the swiveling of base 16.

The embodiment of FIG. 5 shows that it is not necessary to provide a resilient member 26 as the same result can be achieved by a ball-and-socket bearing, or even, as shown in FIG. 5, a ball 40 loosely rolling in an adequately lubricated bowl 42 formed in the base 16.

FIGS. 6 and 7 illustrate devices in which the resilient member 44 which allows the tilt is interposed between the load-carrying member 32 and the shaft 30. In FIG. 7, the shaft 30 and socket 24 are deleted entirely and are replaced by ball bearings directly formed between the base 16 and the support plate 46 which supports the resilient member 44.

It will be seen that herein provided is a three-wheel compound caster which can support a load without physical attachment to the load. Furthermore, the wheels of the caster can freely swivel with respect to the base which itself can both swivel and tilt with respect to the load. It will also be seen that the swiveling ability of the caster with respect to the load permits reversal of the direction of movement of the load without introducing any substantial lateral movement of the load or resistance to forward movement during reversal of the wheel position.

I claim:
1. A universal caster, comprising:
   (a) a base;
   (b) a plurality of caster wheels mounted on said base and adapted to support said base on a floor, said wheels being individually freely swivelable about an axis generally normal to said floor;
   (c) a load-carrying member; and
   (d) means to support said load-carrying member on said base for free rotation about an axis generally normal to said base.

2. The caster of claim 1, in which said means permits at least limited omnidirectional relative movement of said base with respect to the load about an axis generally parallel to said floor.

3. The caster of claim 2, in which there are three caster wheels.

4. A universal caster, comprising:
   (a) a base defining a plane;
   (b) three caster wheels mounted on said base in said plane for individual free swiveling movement about generally equispaced axes normal to said plane;
   (c) a load-carrying member supported on said base for free rotational movement about an axis normal to said plane and located generally equidistantly from said equispaced axes, and for limited tilting movement with respect to said plane.

5. The caster of claim 4, in which a resilient support member is interposed between said load-carrying member and said base.

6. The caster of claim 5, in which said resilient support member is interposed between said load-carrying member and a rigid support member rotatably supported on said base.

7. The caster of claim 5, in which said resilient member is interposed between said base and a swivel mount rotatably supporting said load-carrying member.

8. The caster of claim 4, in which a ball member is interposed between said load-carrying member and said base.

References Cited
UNITED STATES PATENTS 681,123   8/1901   Kennedy _____ 16—47

LEO FRIAGLIA, *Primary Examiner.*

R. R. SONG, *Assistant Examiner.*

U.S. Cl. X.R.

16—47